C. WALPUSKI.
Assignor to J. RECKENDORFER,
Copying Pencil.
No. 7,907. Reissued Oct. 9, 1877.
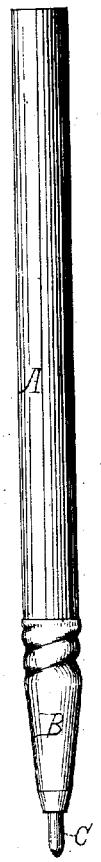
Witnesses:
M. Georgii
D. P. Lom
Inventor:
Chas. Walpuski
by attorney
M. Bailey

UNITED STATES PATENT OFFICE.

CHARLES WALPUSKI, OF YONKERS, ASSIGNOR TO JOSEPH RECKENDORFER, OF NEW YORK, N. Y.

IMPROVEMENT IN COPYING-PENCILS.

Specification forming part of Letters Patent No. 192,555, dated June 26, 1877; Reissue No. 7,907, dated October 9, 1877; application filed September 26, 1877.

DIVISION A.

*To all whom it may concern:*

Be it known that I, CHARLES WALPUSKI, of Yonkers, Westchester county, New York, have invented certain new and useful Improvements in the Manufacture of Pencils, of which the following is a specification:

It is my object to produce a pencil the marks made by which can be copied in the same manner and with the same facility that letters written with copying-ink are copied.

This result I have accomplished by the use of coloring matter, essentially soluble, such as aniline, whose marks or impressions on paper will yield a copy on moistened paper in the ordinary copying-press, said coloring matter being mingled with a suitable base and binding medium, such as white clay and gum used in the manufacture of the cores or slips of ordinary compositions or colored pencils or crayons. In other words, the marking material in my pencil may be substantially like that used in ordinary composition cores or slips, save that aniline in quantity sufficient to cause the marks made with the core to yield a copy takes the place of or is embodied with the coloring or marking material used in the ordinary colored or composition core.

In carrying out my invention, I select aniline soluble in water. I dissolve it in alcohol and water, and add thereto a proper proportion of fine prepared clay. This composition I intimately mix by grinding or otherwise, and subsequently evaporate it in a suitable vessel. To the remainder I add a binding medium—such, for instance, as a solution of gum-tragacanth—until the whole mass becomes a plastic paste which can be readily kneaded and molded.

The clay and gum serve as a base and binding medium for the aniline. Both affect the hardness and consistency of the composition according to the quantity used therein. One compound which gives good results is one hundred parts aniline, fifty parts white clay, and ten parts gum. By varying, however, the proportions of these materials, pencils of various degrees of hardness or softness can be obtained.

When the paste is brought to the desired consistency I press it into any shape that may be desired, then allow it to dry perfectly, and then cut it into the required lengths.

The pencil-cores thus produced may then be dipped into hot melted grease, and afterward are cooled. The dipping may, however, be dispensed with. This completes the process of manufacture, and the cores are ready to be combined with wooden or other sheaths or handles, in the usual way.

According to the color of the aniline, I produce different colors of pencil, and in proportion to the quantity and quality of the clay, or other base and binding medium, I make the pencils of different degrees of hardness or softness.

Pencils thus made can be used as ordinary lead-pencils. On dry paper they leave an impression like that of an ordinary lead-pencil, but more permanent, as the marks cannot be erased with rubber, and on moist or wet paper the marks made by them appear as ink.

Letters written with such pencils can be copied in the ordinary letter-copying press with the same facility as letters written in copying-ink.

The copying operation has the effect of strengthening and developing the original letter. So readily, indeed, do the impressions or marks made by my pencils yield a copy that copies may be made without the use of a copying-press by simply pressing moist copying-paper over the surface of the writing, with the assistance of a blotting-pad, ordinary paper-folder, or other suitable presser. This is due to the quantity of coloring matter contained in the composition.

Copying-pencils, as above described, can be used for marking textile fabrics, wood, &c., where a pen or brush could not be conveniently used.

I have above described one convenient way of carrying out my invention, the method being substantially that which is employed in making ordinary composition leads, save that I use aniline in such proportion as to make the pencil what may be called an "ink copying-pencil."

The proportions in which the different ingredients are to be taken will at once be understood by those acquainted with the art of making pencil-leads. It will also be understood that in lieu of the clay and gum specified, other ordinary or suitable binding media can be employed.

I would also observe that I do not limit myself to the use of aniline. Any other coloring matter which will, like the aniline, yield an impression-copy under conditions substantially as hereinbefore specified will answer the same purpose.

The accompanying drawing represents one ordinary form of pencil in which my invention has been embodied.

A is the wooden sheath, with a tapering split end, encompassed by a conical sleeve, B, which screws onto the sheath. C is a core, made of a composition according to my invention, fitting loosely within the sheath, and held in place by screwing down the sleeve B onto the split and tapering end of the sheath.

Having described my invention, and the manner in which the same is or may be carried into effect, what I claim, and desire to secure by Letters Patent, is—

1. An ink-copying pencil having a marking core or slip composed of a soluble coloring matter whose marks will yield a copy on moist paper in the copying-press, in combination with a suitable base or binding medium. substantially as set forth.

2. The copying-pencil having a marking core or slip composed in the main of an aniline coloring matter, substantially as herein set forth.

In testimony whereof I have hereunto signed my name this 19th day of September, 1877.

CHARLES WALPUSKI.

Witnesses:
WILLIAM V. A. POE,
LEOPOLD ANSBACHER.